Patented Mar. 19, 1940

2,193,876

UNITED STATES PATENT OFFICE 2,193,876

EXTRACTION OF VITAMIN B COMPLEX

Ben Maizel, Milwaukee, Wis., assignor to Vico Products Company, Chicago, Ill., a corporation of Illinois No Drawing. Application January 8, 1936, Serial No. 58,124

22 Claims. (Cl. 167—81)

My invention relates to the extraction of the vitamin B complex from yeast.

It has been proposed heretofore to extract the vitamin B complex from yeast by the use of water as well as by the use of organic solvents such as ethyl and methyl alcohol as extraction solvents but these methods have not been wholly satisfactory. Extraction of the complex by water, while inexpensive from the standpoint of cost of materials, is unsatisfactory in that the filtration of the yeast, particularly wet brewer's yeast, to obtain the extract is extremely difficult and the cost of the installation of proper equipment is prohibitive. The use of organic solvents as extraction media, while economically feasible, has resulted, as heretofore carried out, in the production of products which are characterized by a bitter taste and marked hygroscopicity.

In the American Journal of Hygiene, 6, 197 (1926), McCullum and Kruse report the use of an organic solvent for the extraction of the vitamin B complex. They extracted the vitamin B complex with ethyl alcohol and studied the effect of various acids on the efficiency of the extraction. They did not report drying of the solutions. More extensive work on this subject was done by A. Seidell (Journal of Biological Chemistry, 100, 195 (1933). He studied in detail the efficiency of extraction at different concentrations of various solvents with and without the addition of acids. To obtain the vitamin B complex in concentrated form, he added Fuller's earth to the organic solvent solution of the vitamin B complex and then evaporated the solvent. The patent to Sure, No. 1,869,721, describes extraction with 78% ethyl alcohol followed by evaporation of the solvent to obtain a dry product.

I have discovered that an organic solvent extract of the vitamin B complex from yeast, especially brewer's yeast, contains a gummy material, the nature of which is not completely known to me, and it is this gummy material which imparts a bitter taste, dark color, and other undesirable characteristics to the vitamin B complex, particularly when the latter is in dry, powdered form. By removing this gummy material from the organic solvent extract of the vitamin B complex from yeast, particularly brewer's yeast, and then evaporating the solvent, I obtain products free from bitter tastes, of excellent color, and possessing other advantageous properties compared to the products of a similar nature which have heretofore been produced.

It is accordingly an object of my invention to effect the extraction of the vitamin B complex from yeast in an improved manner.

Another object of my invention is the production of a vitamin B complex concentrate from yeast, particularly brewer's yeast, having good color and being devoid of the bitterness which has characterized the products of the prior art.

A further object of the invention is to effect the removal of the gummy constituents from vitamin B complex extracts.

Other objects and advantages will become apparent as the description proceeds.

In general, my process involves extracting yeast, particularly brewer's yeast, by a solvent comprising a mixture of water and an organic solvent which is completely or substantially completely miscible therewith. Preferably the solvent has a boiling point less than that of water. Examples of suitable solvents are methyl alcohol, ethyl alcohol, acetone, the propyl alcohols, and dioxane. The relative concentration of water and organic solvent may be varied within certain limits which may be readily determined. If the concentration of water is too low, the solubility of the vitamin B complex becomes poor so that an excessive amount of the solution is required to effect efficient extraction. On the other hand, if the concentration of the water is too high, the yeast swells too much making the percolation of the solvent very slow and causing excessive quantities of the solvent to adhere to the yeast. In general, for efficient extraction, it is advisable to keep the concentration of water as low as possible since this results in a lesser extraction of undesired water-soluble materials from the yeast and, in addition, permits the subsequent distillation of the solvent to be carried out at lower temperatures. If desired, a small amount of a suitable acid, such as hydrochloric acid, may be added to the extraction solvent to facilitate the extraction and to protect the vitamin B complex from decomposition but it is to be understood that its use is purely optional. In general the extracting medium should have a pH between about 4 and 7.

The removal of the bitter principles from the extract is effected as a result of separation into phases one of which contains the bitter principles. This may be effected by evaporation of the organic solvent or dilution thereof with water or a combination of the two, as a result of which a separation into phases takes place. Separation into phases may be facilitated in various ways which will be described in detail hereinafter.

While the process is applicable to yeast and particularly brewer's yeast, in general, I have obtained very satisfactory results in connection with the extraction of "Milbrew" yeast. This yeast is a bottom yeast which has been heated for approximately three hours in order to pasteurize it. As a result of such treatment about 40% of the solids are water soluble. A suspension of such yeast in water is difficult to filter and it settles quite slowly.

A specific example of carrying out the process is as follows: Forty-eight pounds of Milbrew yeast is admixed with approximately thirteen gallons of a solution containing ninety parts by volume of C. P. methanol, nine parts by volume of water, and one part by volume of C. P. concentrated hydrochloric acid. The hydrochloric acid may be omitted and satisfactory results obtained. The hydrochloric acid serves to improve the extraction of vitamin G. In addition, its use permits subsequent distillation to be carried out readily at atmospheric pressure. A disadvantage in its use resides in its corrosive effect on the handling equipment. In general, I find that good results are obtained with or without the use of hydrochloric acid. The mixture may, if desired, be allowed to stand for a short period of time, e. g., an hour or more, to permeate the yeast and to facilitate the subsequent extraction of the vitamin B complex. This step, however, is purely optional and may be omitted. The mixture is then placed in a percolator which may be made of copper or other suitable material, and is extracted with twenty gallons of a similar solution for a period of five to six hours. The efficiency of the extraction with respect to vitamin $B_1$ is at least 90%, as indicated by biological assays. However, it should be clearly understood that the efficiency of the extraction process is dependent upon several factors such as the nature of the extracting apparatus, the method used in packing the percolator, the solvent mixture employed, the temperature thereof, the time of extraction, etc. These factors may be controlled by the operator. The extraction may be carried out at room temperatures or at slightly elevated temperatures, generally not in excess of 60° C. According to the specific example described above, room temperatures are employed.

Instead of proceeding as above, the solvent may simply be admixed with the brewer's yeast for one-half hour to one hour and directly pumped to filter presses to separate the yeast residues from the extract. Very efficient extraction of the vitamin B complex is accomplished in this simple manner. The process may be repeated as many times as necessary to obtain complete extraction.

Under the conditions of the process as described above, the total volume of percolate obtained is about twenty-five gallons. This percolate is then distilled under atmospheric pressure until the boiling point of the residue is approximately 90° C. at which stage its volume is about 5% of that of the original solution. If desired, the distillation may be carried out in vacuum.

The residue is then poured into tall containers and allowed to settle for about half an hour. A layer of a gum or gummy material collects on the surface and is skimmed off. The volume of this gum or gummy material may vary but, under the conditions of the process as described, constitutes in the neighborhood of 8% of the solution. The density of the gummy material is greater than that of water. Hence, it is necessary to concentrate the extract to a point sufficient to permit the gum to float to the surface. In general, this concentration will be adequate to effect the desired results when all but approximately 5% of the vitamin-containing extract is evaporated.

The total solids in the remaining solution or residue from which the gummy material has been removed is roughly 10% of the weight of the yeast used. At this point, small quantities of water-insoluble matter may, if desired, be separated by extracting the liquid with about one-half its volume of ethyl acetate or other suitable solvents. To insure that the finished concentrate has no bitter taste whatever and will, in aqueous solution, form a clear product, the liquid may be diluted with its own volume of water and allowed to settle for five or six hours. Additional small quantities of gummy material, if present, will settle in a compact layer on the bottom of the vessel. It is to be understood, however, that the dilution and gum separation steps last listed represent additional refinements which may or may not be employed depending upon the circumstances of the case, the nature of the extract and the particular results sought to be obtained.

The extract may then be treated to adjust its pH to about 5.3 and is dried in any suitable manner. Good results have been obtained with a shelf vacuum drier operating at 140° F. with a 28 inch vacuum for a period of three hours. It is desirable, from the standpoint of economy, to evaporate the extract to a density of about 30° Baumé before placing the material in the shelf drier. The dried product may be powdered or admixed with other ingredients and put up in the form of tablets or in any other desired way for internal administration.

The resulting dried material has a potency of approximately 500 units per gram and the efficiency of extraction is between 80% and 90%.

Instead of drying the material to powder form, the extract may be evaporated to produce a product of pasty consistency.

Instead of effecting the removal of the gum as described above, such can be accomplished in various other ways. For example, to the alcoholic or other solvent extract of the vitamin B complex a solution of calcium chloride in absolute methyl alcohol or containing approximately 10% water can be added. In general, a 5% solution of calcium chloride gives satisfactory results. The gums are precipitated apparently in the form of a calcium salt, the gums being generally acidic in character. After removal of the precipitated gum, the solution is adjusted to a pH of about 6 at which time additional gummy material deposits. Ordinarily, it is not recommended to adjust the pH at this point since the solvent is to be evaporated subsequently. A preferred procedure is to evaporate the organic solvent from the extract and then add the calcium chloride solution and effect the separation of the resulting precipitate in any suitable manner, for example, by decantation or filtration. Instead of calcium chloride, other soluble calcium salts such as calcium acetate can be employed. Even calcium oxide may be used but care must be exercised not to get the vitamin B complex containing solution sufficiently alkaline so that destruction of vitamin B will occur. Barium salts, for example, barium chloride, are also effective for the precipitation of the gummy material from the vitamin B complex containing extract. In general, the acetates, nitrates, and hydrates of the alkaline earth metals may be employed for the purpose described.

Another way of effecting removal of the gummy constituents is to add to the vitamin B complex containing extract an alcohol or an ester or an organic solvent which is miscible with the extraction solvent mixture but is not miscible with water and in which the gummy constituents are soluble. In this manner, the solvent containing the gummy constituents dissolved therein may be removed by decantation from the remainder of the solution containing the desired vitamins. Suitable solvents for this purpose are, for example, iso-propyl alcohol and butyl acetate.

Still another way of separating the gummy constituents is to evaporate the vitamin B complex containing extract to aproximately 10% of its volume. Under these conditions, the gum is present in the form of a fine emulsion, a part of which gum tends to settle to the bottom. The gummy constituents can be removed by centrifuging, for example, with a "Sharples" centrifuge.

In general, I have found that, in operating upon common varieties of brewers' yeast, the phase containing the bitter principles ordinarily separates in a form which sinks in water or watery solutions containing up to about 20% yeast solids and floats in watery solutions containing 50% or more yeast solids. Thus, the phase containing the bitter principles may be separated either by settling to the bottom or by skimming from the top depending upon the degree of concentration. The addition of solvents or alkaline earth salts, as mentioned above, may so change the density relations of the phases as to effect either type of separation at will.

Separation of phases may be promoted, as indicated above, by centrifugal means or, in special cases, by filtration with filter aids.

If desired, the degummed liquid extract, instead of being dried directly as described above, may be admixed with the previously extracted yeast, in other words, the yeast residues, and this mixture may be dried in any suitable manner so that the vitamin potency is not unduly impaired. Such a product is highly desirable for internal administration and is free from the excessively bitter taste and objectionable odor and color and other properties which characterize ordinary dried brewers' yeast.

It will be appreciated that, in the case of different yeasts or different brewers' yeasts, or where other solvents are employed, the procedure may have to be slightly modified. This, however, will be readily ascertained and accomplished by the worker skilled in the art.

I have also found that the addition of bases, such as ammonia, to the extracting medium serves to inhibit the extraction of the vitamins from the yeast without, however, interfering with the removal of the bitter substances. In so operating, however, care must be exercised to insure that the extracting medium does not have too high a degree of alkalinity since alkalies, in general, are destructive to vitamin B. In addition, the extraction should be carried out fairly rapidly to minimize destruction of vitamin B by the alkali. By proceeding as here indicated, a bitterless yeast residue having a high vitamin B potency is obtained. The solvent may be recovered from the extract by distillation.

The vitamin B complex concentrate may be made even less hygroscopic if about 10% of bentonite is ground together with the dried extract. Such a product will remain dry and free-flowing even when left in a loose-stoppered bottle over a period of months.

Activated fuller's earth of 400 units vitamin $B_1$ per gram potency can easily be prepared from the dried extract of my invention. To accomplish this, the dried powdered extract may be dissolved in about 10 times its weight of water, the pH thereof adjusted to 4.5, and the desired amount of fuller's earth is agitated in the solution for an hour or more and then filtered. The resulting product is then dried, for example, at room temperature. Drying at 95° C. for three hours does not appear to affect the potency of the products. Instead of first drying the vitamin B complex extract and then re-dissolving it to make the fuller's earth product just described, the liquid extract, as it is obtained in the process, may be agitated with fuller's earth and the product thereby obtained.

Another very satisfactory way of rendering the yeast complex non-hygroscopic is as follows: To the vitamin B complex in paste form, and containing in the neighborhood of 60% to 75% dry material, I add an amount of freshly precipitated casein so that after drying in vacuo the complex solids are about 80% of the total. Some improvement is effected if milk of lime is added to the casein before or after it has been mixed with the vitamin B complex paste, but one must be careful not to overstep or the alkaline side in order to prevent injury to the vitamin B. A ratio of 5 parts of lime to 100 parts of casein has been found to be suitable.

Very satisfactory results have been obtained by substituting egg whites for the casein in the example described above. After admixture with the egg white, the vitamin B complex product is subjected to heat, as by immersion in hot water, to coagulate the egg whites. After drying in vacuo and grinding, the resulting powder appears to have no tendency to cake when exposed to air or dispersed in oil or oleaginous media. This product is easily handled and is admirably suited for use in the preparation of capsules.

As indicated above, the dried vitamin B complex extract is characterized by freedom from gummy constituents, absence of bitterness, ready solubility in water, and a very agreeable taste, odor and color which serve to readily distinguish it from products of a similar nature which have heretofore been prepared.

What I claim as new and desire to secure by Letters Patent of the United States is:

1. A process of recovering the vitamin B complex from brewer's yeast which comprises extracting the yeast with a solvent which does not substantially swell the yeast and in which said complex is soluble, the extraction being carried out at a temperature not substantially in excess of 60° C., separating the extract from the yeast residue, and removing the gummy constituents from said extract.

2. A process of recovering the vitamin B complex from brewer's yeast which comprises extracting the yeast with an aqueous-containing organic solvent which does not substantially swell the yeast and in which said complex is soluble, separating the extract from the residue, and removing the gummy constituents from said extract.

3. A process of recovering the vitamin B complex from brewer's yeast which comprises extracting the yeast with an aqueous-containing alcoholic solvent which does not substantially swell the yeast and in which said complex is soluble, separating the extract from the residue, and removing the gummy constituents from said extract.

4. A process of recovering the vitamin B complex from brewer's yeast which comprises extracting the yeast with a solvent, comprising a major portion of methyl alcohol and a minor portion of water, which does not substantially swell the yeast and in which said complex is soluble, separating the extract from the yeast residue, and removing the gummy constituents from said extract.

5. A process of recovering the vitamin B complex from brewer's yeast which comprises extracting the yeast with a solvent which does not substantially swell the yeast and in which said complex is soluble, separating the extract from the yeast residue, evaporating the extract sufficiently to permit the gummy constituents therein to float to the surface, and removing said gummy constituents therefrom.

6. A process of recovering the vitamin B complex from brewer's yeast which comprises extracting the yeast with an aqueous-containing organic solvent which does not substantially swell the yeast and in which said complex is soluble, separating the extract from the residue, evaporating the extract sufficiently to permit the gummy constituents therein to float to the surface, and removing said gummy constituents therefrom.

7. A process of recovering the vitamin B complex from brewer's yeast which comprises extracting the yeast with an aqueous-containing alcoholic solvent which does not substantially swell the yeast and in which said complex is soluble, separating the extract from the residue, evaporating the extract sufficiently to permit the gummy constituents therein to float to the surface, and removing said gummy constituents therefrom.

8. A process of recovering the vitamin B complex from brewer's yeast which comprises extracting the yeast with a solvent, comprising a major portion of methyl alcohol and a minor portion of water, which does not substantially swell the yeast and in which said complex is soluble, separating the extract from the yeast residue, evaporating the extract sufficiently to permit the gummy constitutents therein to float to the surface, and removing said gummy constituents therefrom.

9. In a process of recovering the vitamin B complex from liquid extracts containing the same, the step which comprises de-gumming said liquid extract.

10. In a process of recovering the vitamin B complex from brewer's yeast, the steps comprising producing a liquid extract containing said complex, and de-gumming said liquid extract.

11. In a process of recovering the vitamin B complex from brewer's yeast, the steps comprising extracting said complex by means of an aqueous-organic solvent to produce a liquid extract, and de-gumming said liquid extract.

12. In a process of recovering the vitamin B complex from extracts containing the same, evaporating the extract to an extent sufficient to permit the gummy constituents therein to float to the surface, and removing said gummy constituents therefrom.

13. In a process of recovering the vitamin B complex from brewer's yeast, the steps comprising producing an extract containing said complex, evaporating the extract to an extent sufficient to permit the gummy constituents therein to float to the surface, and removing said gummy constituents therefrom.

14. In a process of recovering the vitamin B complex from brewer's yeast, the steps comprising extracting said complex by means of an aqueous-organic solvent, evaporating the extract to an extent sufficient to permit the gummy constitutents therein to float to the surface, and removing said gummy constituents therefrom.

15. The process of treating brewer's yeast which includes the steps of extracting said yeast with a solution containing approximately 10% by volume of water and approximately 90% by volume of an organic solvent which is miscible therewith for a period of time sufficient to effect substantial extraction of the vitamin B complex from the yeast, separating the extract from the yeast residue, evaporating the extract to a point sufficient to permit the gummy constituents to separate therefrom, permitting the extract to stand until the gummy constituents rise to the surface, and removing said gummy constituents.

16. The process of claim 15, wherein the organic solvent is a member of the class consisting of methyl alcohol and ethyl alcohol.

17. The process of treating brewer's yeast which comprises extracting it with a solvent to produce a liquid extract containing the vitamin B complex normally present in said yeast, de-gumming said liquid extract, admixing said de-gummed liquid extract with previously extracted brewer's yeast, and then drying the mixture.

18. A dried extract prepared from brewer's yeast, said extract being intimately admixed with coagulated egg white to render the product substantially non-hygroscopic, the product being further characterized by a light color, good taste and a high content of the vitamin B complex, and being substantially free of bitterness and gummy constituents.

19. A concentrated extract prepared from brewer's yeast, said extract being intimately mixed with egg white, whereby the hygroscopicity of said extract is substantially decreased, the product being further characterized by a light color, good taste, and a high content of the vitamin B complex.

20. The process of claim 1 wherein the removal of the gummy constituent is effected by precipitation thereof by the addition to the extract of an alkaline earth material.

21. The process of claim 3 wherein the removal of the gummy constituent is effected by precipitation thereof by the addition to the extract of an alkaline earth material.

22. The process of claim 4 wherein the removal of the gummy constituents is effected by precipitation thereof by the addition to the extract of a calcium salt.

BEN MAIZEL.